United States Patent
Lang

(10) Patent No.: US 10,908,775 B2
(45) Date of Patent: Feb. 2, 2021

(54) METHOD FOR QUICK NAVIGATION IN A USER INTERFACE, METHOD FOR MANUFACTURING A PRODUCT FROM THERMOPLASTIC, PLANT CONTROL FOR QUICK NAVIGATION IN A USER INTERFACE AND PLANT FOR MANUFACTURING A PRODUCT FROM THERMOPLASTIC

(71) Applicant: Reifenhäuser GmbH & Co. KG Maschinenfabrik, Troisdorf (DE)

(72) Inventor: Lang Lang, Cologne (DE)

(73) Assignee: REIFENHÄUSER GMBH & CO. KG MASCHINENFABRIK

( * ) Notice: Subject to any disclaimer, the term of this patent is extended or adjusted under 35 U.S.C. 154(b) by 119 days.

(21) Appl. No.: 15/703,690

(22) Filed: Sep. 13, 2017

(65) Prior Publication Data

US 2018/0107351 A1 Apr. 19, 2018

(30) Foreign Application Priority Data

Oct. 18, 2016 (DE) ........................ 10 2016 012 474

(51) Int. Cl.
*G09G 1/00* (2006.01)
*G06F 3/0482* (2013.01)
(Continued)

(52) U.S. Cl.
CPC ............ *G06F 3/0482* (2013.01); *B29C 48/92* (2019.02); *G06F 3/0236* (2013.01);
(Continued)

(58) Field of Classification Search
CPC ........ G06F 3/048; G06F 17/30; G06F 3/0482; G06F 3/0236; G06F 3/023
See application file for complete search history.

(56) References Cited

U.S. PATENT DOCUMENTS

| 7,191,411 B2 | 3/2007 | Moehrle |
| 2007/0121076 A1* | 5/2007 | Klippstein ........... G02B 27/225 353/30 |

(Continued)

FOREIGN PATENT DOCUMENTS

| DE | 19942871 A1 | 3/2001 |
| DE | 10215092 A1 | 10/2003 |

(Continued)

*Primary Examiner* — Michael A Faragalla
(74) *Attorney, Agent, or Firm* — Tarolli, Sundheim, Covell & Tummino LLP

(57) ABSTRACT

A method and a device for the quick navigation of users through the user interface of a plant for manufacturing a product from thermoplastic, an extruder being operated for plastification of a thermoplastic, and a method and a plant for manufacturing a product from thermoplastic allow quick changing between user views of a machine or plant control. An input device for entering representative signals from a customized input library is used, which signals are linked to actions in a relational database, wherein the actions cause a rapid change between user views of a machine or plant control.
The rapid change between user views makes the machine or plant control faster, and the customized input library makes the control more intuitive.

18 Claims, 4 Drawing Sheets

(51) Int. Cl.
   *G06F 3/0488* (2013.01)
   *B29C 48/92* (2019.01)
   *G06F 3/023* (2006.01)
   *G06F 3/0354* (2013.01)

(52) U.S. Cl.
   CPC ........ *G06F 3/03545* (2013.01); *G06F 3/0488* (2013.01); *G06F 3/04883* (2013.01); *G05B 2219/23082* (2013.01)

(56) References Cited

U.S. PATENT DOCUMENTS

2008/0283184 A1* 11/2008 Sagona ................... B65B 61/20
                                                            156/256
2011/0010624 A1*  1/2011 Vanslette .............. G06F 3/0485
                                                            715/704
2017/0277224 A1*  9/2017 Mizushi ................ G06F 1/1607

FOREIGN PATENT DOCUMENTS

| DE | 102007051017 A1 | 3/2009 | |
|----|----|----|----|
| DE | 102007051015 A1 | 4/2009 | |
| DE | 102009058538 A1 | 6/2011 | |
| DE | 102015117890 A1 | 4/2016 | |
| DE | 102016000773 A1 | 8/2016 | |
| EP | 1020789 A1 | 7/2000 | |
| WO | 2006125404 A1 | 11/2006 | |
| WO | 2014075121 A1 | 5/2014 | |
| WO | WO 2014/075121 * | 5/2014 | ........... G06F 3/0488 |

* cited by examiner

METHOD FOR QUICK NAVIGATION IN A USER INTERFACE, METHOD FOR MANUFACTURING A PRODUCT FROM THERMOPLASTIC, PLANT CONTROL FOR QUICK NAVIGATION IN A USER INTERFACE AND PLANT FOR MANUFACTURING A PRODUCT FROM THERMOPLASTIC

CROSS REFERENCE TO RELATED APPLICATIONS

This application is related to and claims the benefit of German Patent Application No. DE 10 2016 012 474.1, filed on Oct. 18, 2016, the contents of which are herein incorporated by reference in their entirety.

TECHNICAL FIELD

The disclosure refers to a method for quick navigation in a user interface, a method for manufacturing a product from thermoplastic, a plant control for quick navigation in a user interface and a plant for manufacturing a product from thermoplastic.

BACKGROUND

In particular, the disclosure refers to a method for quick navigation in a user interface for monitoring and controlling a machine or a plant for manufacturing a product from thermoplastic, the plant or machine having an extruder for plastification of a thermoplastic; a method for manufacturing a product from thermoplastic, with an extruder being operated for plastification of a thermoplastic; a plant control for quick navigation in a user interface for monitoring and controlling a machine or a plant for manufacturing a product from thermoplastic, the plant or machine having an extruder for plastification of a thermoplastic, the user interface having a plurality of operating pages; wherein a user inputs an input signal by means of an input interface for navigating through the user interface of the machine, the input interface having a touch screen, and a plant for manufacturing a product from thermoplastic, with an extruder for plastification of a thermoplastic. The user interfaces for machine or plant operation are linked to the corresponding operating pages and navigation through them is made possible by means of software buttons. Navigation through the operating pages generally works by means of a tree structure. With use of a tree structure, to reach a new operating page, one has to go back in navigation and then navigate to the target page.

The operating pages are, for the most part, not arranged according to the desires of the user; thus, the user sometimes has to navigate for a long time until he reaches a specific page.

DE 199 42 871 A1 discloses a method for operating a voice-controlled command input unit in a motor vehicle. All documents not showing a plant control are to be considered as not pertaining to the field of the present disclosure.

EP 1 020 789 A1 discloses a device with a manual control or a voice control for accessing the functionalities of the device. Voice commands can be used for the quick access to functionalities.

DE 102 15 092 A1 describes a method for facilitating the control of devices belonging to the equipment of a vehicle.

U.S. Pat. No. 7,191,411 B2 describes a method for navigation in a multi-stage menu structure which can be collapsed in a hierarchical manner.

WO 2006/125404 A1 discloses a method for adjusting a field device, wherein an electronic control unit of a field device recognizes an external data storage module associated with the field device and performs settings in the field device by means of data which have been read.

DE 2007 051 015 A1 describes a dialog system for a motor vehicle having a plurality of operator buttons, at least one of which can be assigned to a function from a predefined set of functions.

DE 10 2007 051 017 A1 discloses an operating system for a motor vehicle having a screen display as well as at least one manual operating element for selecting and/or activating at least one entry in a current menu level of a menu structure.

DE 10 2009 058 538 A1 describes an operating device with preferred operating functions for a motor vehicle.

SUMMARY

The disclosure is based on the task of providing the state of the art with an improvement or an alternative.

In a first aspect of the disclosure, the task is solved by a method for quick navigation in a user interface for monitoring and controlling a machine or a plant for manufacturing a product from thermoplastic, the plant or machine having an extruder for plastification of a thermoplastic, the user interface having a plurality of operating pages, wherein a user enters an input signal by means of an input interface for navigating through the user interface of the machine or plant, the input interface having a touch screen and the input signal being associated with an operating page in a database by means of an assignment performed individually by the user, and the user interface changing directly to the associated operating page when the input signal is entered.

Some terminology will be explained in the following:

First, it is explicitly pointed out that within the framework of the present patent application, indefinite articles and numerals such as "one", "two" etc. are normally to be understood as indicating a minimum, that is, "at least one . . . ", "at least two . . . " etc., unless it becomes clear from the context or is obvious or seems technically indispensable to the person skilled in the art that only "exactly one . . . ", "exactly two . . . " etc. can be intended there.

The term "user interface", in particular "graphical user interface", designates a type of user interface of a computer, namely of a computer of an industrial plastic forming plant for processing thermoplastic. Its task is to make application software on the computer controllable by means of graphical symbols and control elements. A user interface can be controlled by means of a mouse or by touching a touch screen, with use or selection of graphical elements. A "user interface" has a plurality of different operating pages.

A "machine" is a technical device with parts moved by an actuating system.

A "plant" is a methodical arrangement of machines, devices and/or apparatuses which are spatially interconnected. The machines, devices and/or apparatuses can be associated with each other functionally, in terms of control or in terms of safety.

An "operating page" is a graphical part of a user interface. It contains a graphic representation of a plant or machine by means of which the plant or machine can be controlled and monitored.

An "input interface" is a type of operating page for the user interface. It contains in particular the functions of gesture control, numeric keypad, pattern input box, saving, searching and managing.

An "input signal", in particular a "gesture", a "number" or a "pattern", is a signal which is input by a user by means of the touch screen.

A "sensor screen" may also be called a "touch sensitive screen" or a "touchscreen". A touch screen is a combined input and output device by means of which the program execution of a technical device, generally a computer, can be directly controlled by touching parts of an image. The technical processing of the command is invisible to the user, creating the impression of direct control of a computer by touch of a finger. The image which is made sensitive to touch by means of the touch pad can be created in different ways: dynamically by means of monitors, by projection or physically. Instead of controlling a mouse pointer with a mouse or the like, a finger or a stylus can be used.

A "database" is a system for electronic data management. The task of a database is to store large amounts of data efficiently, consistently and permanently and to provide required subsets of the stored data to users and application programs in different forms of representation depending on requirements.

The state of the art provides for the user interfaces of a machine or plant controller to be linked to the corresponding operating pages and for navigation between them to be enabled by software buttons. Navigation through the operating pages normally functions by means of a tree structure. Due to the tree structure, one has to go back in navigation and then navigate to the target page in order to go to a different operating page.

Furthermore, the operating pages are generally not arranged according to the desires of a user. This leads to the necessity for a user to navigate often for a very long time to reach the desired operating page, especially in case of complex machines or plants with a plurality of nested operating pages.

Especially if time is short and quick inputs by the user are required, this can lead to problems in handling the plant or machine control.

For solving these problems, the state of the art offers the solution that users can generate shortcuts or favorites bars. "Favorites bars" are a designation for a collection of stored links to the operating pages.

With complex processes, however, this alleged solution leads to the necessity of again generating a confusingly large number of various shortcuts in the favorites bar on the touch screen, leading again to confusing arranged navigation paths which is again associated with substantial search efforts on the part of the user. Furthermore, the shortcuts and favorites bars need a large amount of space on the user interface, reducing the space for displaying an operating page. Consequently, a smaller number of elements can be arranged on one operating page to prevent messages to the user and control elements from becoming so small that they can no longer be seen or operated by the user.

Currently, therefore, the state of the art necessitates multiple navigation steps and long navigation times for complex machines and plants.

As an alternative, it is proposed here to provide the user interface with a unique input interface which can process various classes of individualized input signals and which, if an input signal is entered by the user, immediately displays to him a clearly arranged operating page.

Thus, with a clearly arranged input interface, the user obtains quick and easy access to the operating page.

The input signals are assigned to the operating pages by means of a database which can be set up individually by each user according to his desires and requirements, so that a high degree of intuition for controlling the machine or the plant can be achieved.

As a whole, it is advantageously achieved that a user can reach the operating pages of the machine and/or plant control comfortably by means of input signals which can be intuitively used by him personally.

Thus, the user no longer has to navigate through a tree structure which is often unclear in case of complex machines; instead, he can save time by a quick, intuitive and targeted change of views of operating pages.

In critical states of operation, this additional time can constitute the decisive advantage necessary for being able to continue production within the permissible parameter limits; in particular, the risk of an interruption of production can be substantially lowered in this manner.

Thus, individual navigation through the operating pages of the machine and/or plant control cannot only increase the ease of operation, but with a suitable embodiment, it can also raise the overall efficiency of man and machine.

Another advantage of navigation through the operating pages, which is proposed here, can be that the separation between input interface and operating page helps to avoid maloperation, since navigation does not take place directly via the operating page and therefore an erroneous input in the input interface would lead, in the worst case, only to an erroneous navigation to an undesired operating page, which could then be left again in the direction of the desired operating page without any consequences.

Preferably, the input interface is released by pressing a mechanical release button and keeping it pressed.

Advantageously, the plant or machine can be secured in this manner against an undesired or inadvertent maloperation on the part of the user.

Optionally, the input interface is released by clicking on a virtual release button on the touch screen and keeping it pressed.

Advantageously, the plant or machine can be secured in this manner against an undesired or inadvertent maloperation on the part of the user.

Preferably, the input interface is operated with a finger or with a stylus.

A "stylus" is an input device which can be held in one's hand like a pen, is formed like a pen and used like a pen; thus, the stylus can be used to write virtually on the touch screen.

Advantageously, an optimum and intuitive level of user comfort can be achieved in this manner.

Thus, the user does not have to get used to complex navigation or control devices, but can control the machine and/or plant very easily and intuitively, especially since he has already gotten used to inputting data with a finger or a stylus in many everyday situations, outside the professional context, and has been acquainted with the advantages thereof. That is, he already knows these control elements and can adapt very quickly to this very intuitive type of machine and/or plant control.

Optionally, the input interface has a gesture control, and the input signal is a gesture.

A "gesture" is a movement for interaction with a computer. A gesture is used as an input signal.

"Gesture control" is the automatic recognition, by a computer, of gestures performed by man for man-machine interaction.

Thus, the user can "draw" figures (input figures) on the input interface in one trace with the finger or the stylus, for instance triangles, circles etc. The drawn input figures are linked or can be linked to any operating page. If stored figures are input, the system directly goes to the linked operating page. By drawing input figures in the input box, it is possible to jump from page to page.

Advantageously it is achieved that the control of the machine and/or plant can become even more intuitive in this manner, the number of maloperations can be further reduced, pleasure for the user and the speed of navigation can be further increased and the efficiency of interaction between man and machine can be improved.

Navigation with gestures can be particularly advantageous since it may be especially easy for people to intuitively link processes of the machine and/or plant to a simple input figure.

Preferably, the gesture is a drawn figure, in particular a triangle or a circle or a different plane geometrical shape, where the figure can also be quasi-three-dimensional due to recognition of intensity.

For instance, the input interface can have a numeric keypad, and the input signal can be a number.

A "number" is an identifier comprising a string of digits which is used as an input signal.

A "numeric keypad" is an input field for entry of a number.

Thus, with the numeric keyboard function, the user can, for instance, enter a sequence of numbers in order to go to a specific operating page.

In this manner, it can advantageously be achieved that control of the machine and/or the plant become even more intuitive, further lowering the number of maloperations, additionally increasing fun for the user and the speed of navigation and improving the efficiency of interaction between man and machine.

Particularly for people with an intrinsically high degree of understanding for numbers, navigation with numbers can be advantageous.

Optionally, the input interface can have a pattern input field and the input signal can be a pattern.

A "pattern" is a static structure used as an input signal which is recognized by its exact recurrence. It is intended for precise repetition.

A "pattern input field" is an input field for entry of a pattern.

Thus, with the function of the pattern input field, the user can reach the desired operating page of the machine in a very individual manner which is easy to be remembered and very comfortable.

In this manner, it can advantageously be achieved that control of the machine and/or of the plant become even more intuitive, further lowering the number of maloperations, additionally increasing fun for the user and the speed of navigation and improving the efficiency of interaction between man and machine.

Optionally, the pattern is input in a point array.

A "point array" is a cartesian arrangement of dots.

Input of a pattern in a point array takes place if a curve, in particular a polygonal line, is drawn with one's finger or with a stylus, which curve interconnects a series of dots. The number of dots on curve may be lower than the number of dots in the point array.

In an advantageous embodiment, input of an input signal through a pattern on a point array takes place only by creation of a pattern in a point array.

In this manner, it can advantageously be achieved that control of the machine and/or the plant become even more intuitive, further lowering the number of maloperations, additionally increasing fun for the user and the speed of navigation and improving the efficiency of interaction between man and machine.

Point arrays can be especially advantageous since the linkages are activated curves and the individual curves may represent geometrical components of the machine and/or plant which are to be controlled or monitored so that a very high degree of optical assignment of the individual linkages is possible.

Preferably, the input interface has a function for saving which creates and saves a linkage between an input signal and an operating page.

The function "Save" allows a linkage between an operating page and a gesture, a number or a pattern.

Saving can take place as follows: when an operating page has not yet been linked or is to be re-linked to an input figure, a numerical sequence or a pattern, this button is activated to save it. This function checks for a doubling of input and linked operating pages and saves the new linkage.

Advantageously, in this manner, the user can create and store individual linkages and afterwards use them repeatedly.

Optionally, the function "Save" will search for a doubling of the input and the linkage of the operating page before saving is performed.

Advantageously, in this manner, the same input signal can be prevented from being used multiple times. In addition, it can be achieved that there is only one linkage for each operating page so that a unique assignment can be achieved with a minimum number of linkages used.

Preferably, the input interface has a "Search" function used for searching a link between an input signal and an operating page in the database.

The "Search" function allows searching the database for a stored linkage between an operating page and a gesture, a number or a pattern.

With this function, the user can have his input figures, numerical sequences and patterns listed and find them.

Advantageously, in this manner, the user can optimally use, program and get to know the functionality of the input interface.

Optionally, the input interface has a "Management" function by means of which a link between an input signal and an operating page in the database is managed, where in particular a plurality of linkages can be sorted or a linkage can be deleted.

The "Management" function allows the sorting and deleting of linkages between an operating page and a gesture, a number or a pattern.

A "Menu" is a type of interactive user guidance in computer programs with graphical, key-operated or voice-operated user interface. It makes it possible to select the desired command from a list and have it executed without knowing and having to apply the actual control commands.

With this function, the user can have his input figures, numerical sequences and patterns listed and can manage them. Management allows sorting and deleting of the linkages of the customized input signals.

Advantageously, in this manner, the user can optimally use, program and get to know the functionality of the input interface. Preferably, the database is a relational database.

A "relational database" is used for electronic data management in computer systems and is based on a table-based relational database model.

Advantageously, in this manner, the assignment of the linkages can be made very easy and efficient.

Optionally, the database can have an input library with a plurality of linkages between an input signal and an operating page.

An "input library" manages the assignment of an input signal to a linked operating page.

Advantageously, in this manner, the process of managing the linkages can be greatly facilitated since the user is familiar with the use of libraries from everyday life, also apart from professional applications.

In this manner, it can advantageously be achieved that control of the machine and/or the plant become even more intuitive, further lowering the number of maloperations, additionally increasing fun for the user and the speed of navigation and improving the efficiency of interaction between man and machine.

Preferably, there is an individual input library for each user.

Advantageously, in this manner, the machine and/or plant control can be adapted individually and optimally to the requirements and habits of a specific user.

In this manner, it can advantageously be achieved that control of the machine and/or the plant become even more intuitive, further lowering the number of maloperations, additionally increasing fun for the user and the speed of navigation and improving the efficiency of interaction between man and machine.

In a second aspect of the disclosure, the disclosure provides a method for manufacturing a product from thermoplastic, with an extruder being operated for plastification of a thermoplastic; wherein during the manufacturing a process as described above is performed.

It is understood that the advantages of a method for quick navigation in a user interface for monitoring and controlling a machine or a plant for manufacturing a product from thermoplastic as described above directly extend to a machine or a method for manufacturing a product from thermoplastic, wherein an extruder is operated for plastification of a thermoplastic.

It is explicitly pointed out that the subject matter of the second aspect can advantageously be combined with the subject matter of the first aspect of the disclosure.

In a third aspect of the disclosure, the disclosure provides a plant control for quick navigation in a user interface for monitoring and controlling a machine or a plant for manufacturing a product from thermoplastic, the machine or plant having an extruder for plastification of a thermoplastic, and the user interface having a plurality of operating pages, wherein a user inputs an input signal for navigating through the user interface of the machine or plant by means of an input interface, the input interface having a touch screen and the plant control having a data processing and detection unit, the data processing and detection unit having a program and having access to a database, the program being adapted for execution of the claimed method.

A "data processing and detection unit" is an electronic unit which manages data in an organized manner with the aim of obtaining information about these data or to alter them. The data are recorded in data sets, processed by man or the machine according to a predefined procedure and are output as a result.

Advantageously, in this manner, the advantages which were already mentioned and described above in connection with the aspects of the method for quick navigation in a user interface can be transferred to a machine control, in particular, a machine control with a quick user navigation through the operating pages of a user interface.

It is understood, that the advantages of the method aspects also extend to the machine control.

Preferably, the machine control has a release button which releases use of the input interface.

An input interface is activated by clicking on a release button and keeping it pressed.

Advantageously, in this manner, the plant or machine can be secured against an undesired or inadvertent maloperation by the user.

Advantageously, in this manner, the risk of maloperation of the machine or plant can be reduced.

Optionally, the input signal is linked to an operating page in a database and when the input signal is entered, the user interface directly goes to the linked operating page, wherein the input signal can be a gesture and/or a number and/or a pattern.

In this manner, it can advantageously be achieved that control of the machine and/or the plant become even more intuitive, further lowering the number of maloperations, additionally increasing fun for the user and the speed of navigation and improving the efficiency of interaction between man and machine.

It is explicitly pointed out that the subject matter of the third aspect can advantageously be combined with the subject matter of each of the above aspects of the disclosure individually or in a cumulative manner, in any combination.

In a fourth aspect of the disclosure, the disclosure provides a plant for manufacturing a product from thermoplastic, with an extruder for plastification of a thermoplastic, the plant having a machine control according to the Claims of the third aspect of the disclosure.

It is understood that the advantages of a plant control for quick navigation in a user interface for monitoring and controlling a machine or a plant for manufacturing a product from thermoplastic also extend to a plant for manufacturing a product from thermoplastic.

It is explicitly pointed out that the subject matter of the fourth aspect can advantageously be combined with the subject matter of each of the above aspects of the disclosure, individually or in a cumulative manner.

Preferably, the gestures, input figures, numerical sequences or patterns should be unambiguous.

Preferably, the risk of maloperation of the machine or plant can be reduced in this manner.

Preferably, only a quick change between preferred operating pages without a risk of maloperation is possible, because the functions of the plant are not affected by the method for quick navigation in a user interface.

Advantageously, in this manner, the risk of a maloperation of the machine or plant can be reduced.

BRIEF DESCRIPTION OF THE DRAWINGS

In the following, the disclosure will be explained in more detail using two examples of embodiment with reference to the drawings wherein.

DETAILED DESCRIPTION OF THE DRAWINGS

Figure 1:
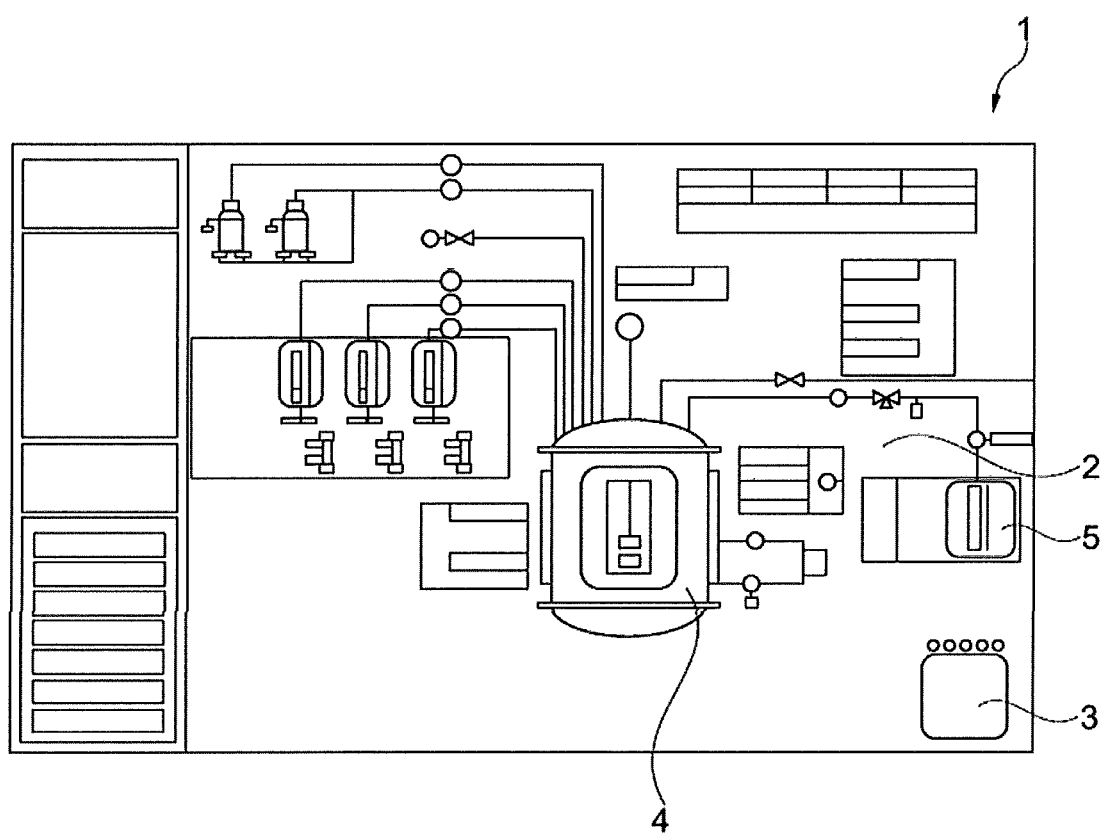
FIG. 1 shows a schematic example of an input interface design.

A user interface 1 for monitoring and controlling a machine or plant, comprising an operating page 2 and an input interface 3, is shown in FIG. 1.

The operating page has a plurality of different operating elements 4, 5 which can be used for monitoring and controlling the machine or plant (for purposes of clarity, only two operating elements are mentioned as examples).

The operating elements 4, 5 are linked to each other with regard to process control.

Figure 2:
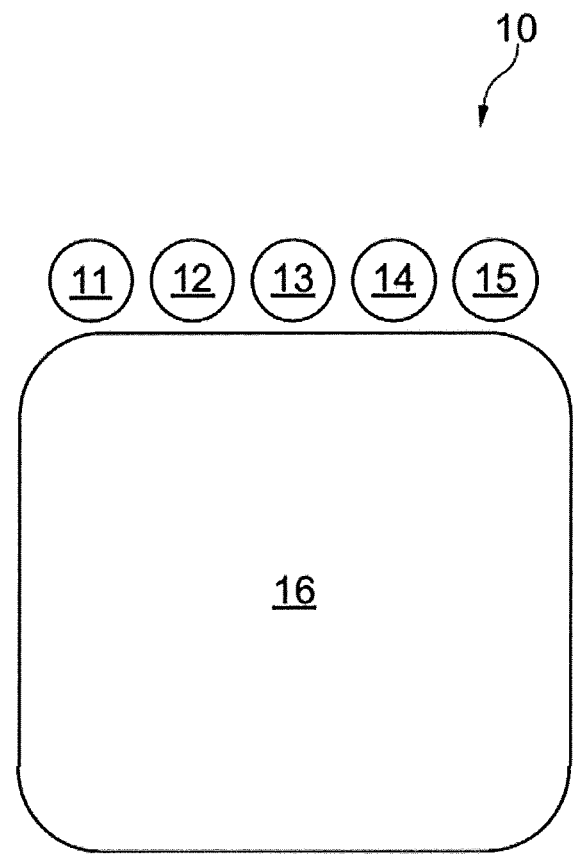
FIG. 2 shows an enlarged view of an input interface.

An input interface 3, 10 has an input field 16 and several function elements 11, 12, 13, 14, 15, and is shown enlarged in FIG. 2, and is emphasized as a detail from FIG. 1 for better clarity and explanation.

In terms of displaying, the input field 16 can be adapted for different types of input signals, in particular for a gesture, a number or a pattern.

The input field 16 in FIG. 2 is adapted for a gesture as an input signal.

The function elements 11, 12, 13, 14, 15 of the input interface 3, 10 can be linked to different functions, in particular to the functions "Search", "Save", "Manage" and "Change display input signal".

Figure 3:
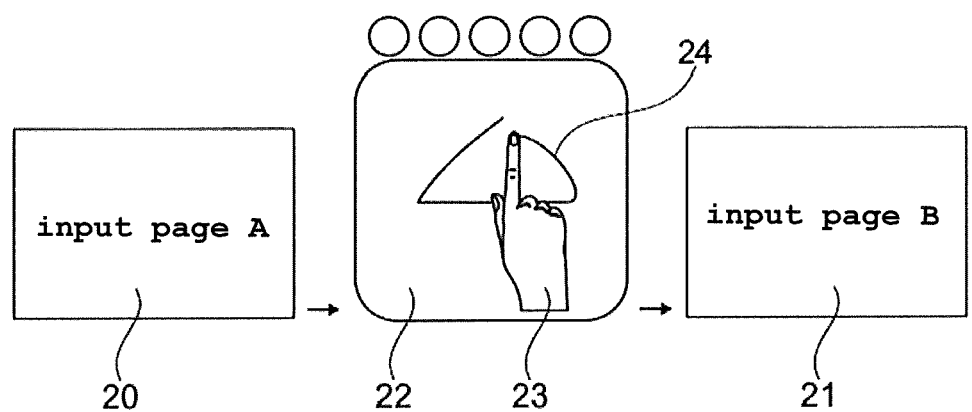
FIG. 3 shows an example of embodiment for navigation in a user interface of a machine or plant control by means of a gesture.

A specific embodiment in which the user changes with one hand 23 by an input of a gesture 24 on an input field for gesture 22 from an input page 20 to a different input page 21, is schematically shown in FIG. 3.

Figure 4:
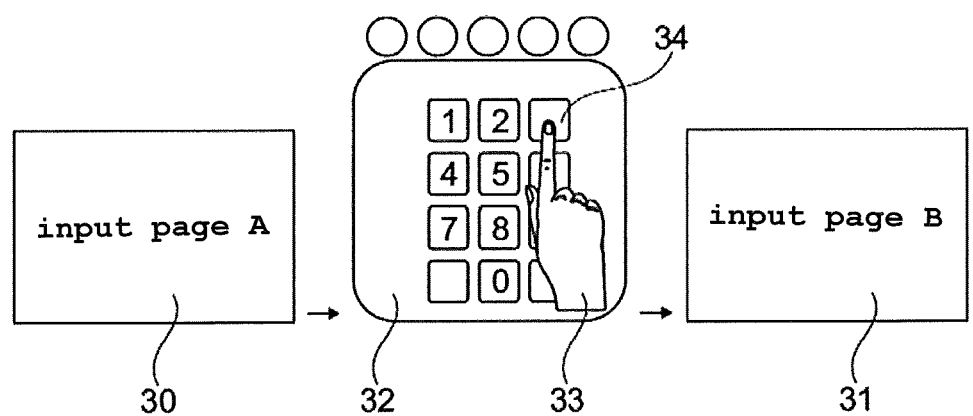
FIG. 4 shows an example of embodiment for navigation in a user interface of a machine or plant control by means of a number.

An alternative embodiment in which the user changes from one input page 30 to a different input page 31 by inputting a number in an input field numeric keypad 32 with one hand 33, is schematically shown in FIG. 4.

Figure 5:
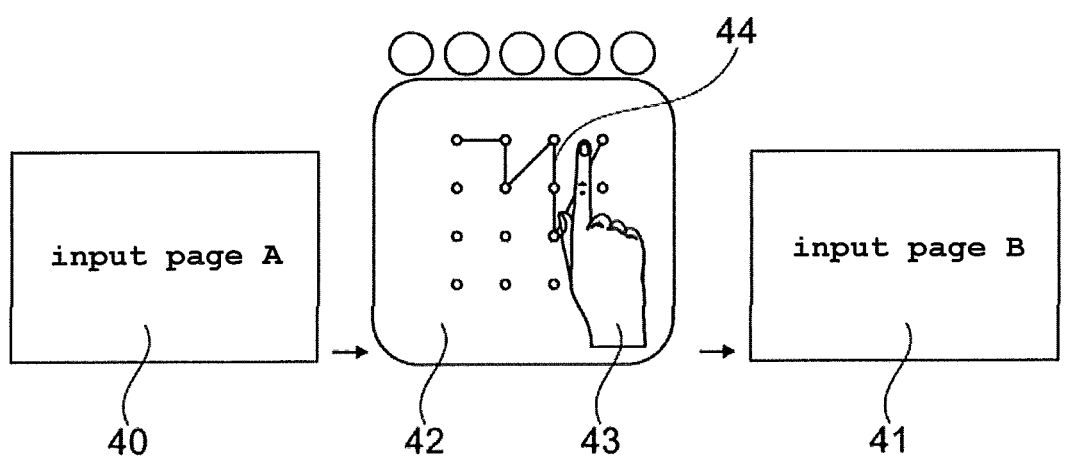
FIG. 5 shows an example of embodiment for navigation in a user interface of a machine or plant control by means of a pattern in a point array.

An alternative embodiment in which the user changes from one input page 40 to a different input page 41 by inputting a pattern 44 in an input field "pattern with point array 42" with one hand 43 is schematically shown in FIG. 5.

The invention claimed is:

1. A method for quick navigation in a user interface for monitoring and controlling a machine or a plant for manufacturing a product of thermoplastic, the plant or machine having an extruder for plastification of a thermoplastic, the method comprising:
    displaying on an input interface a given operating page of a plurality of operating pages, wherein each operating page is associated with a unique input signal, and an association of each operating page and a respective unique input signal is stored in a database, wherein each unique input signal is one of a unique traced pattern in a point array and a unique gesture drawing, wherein the database comprises an input library comprising a plurality of linkages between a given input signal and an operating page of the plurality of operating pages, wherein the input library is individual for each user;
    receiving, via a touch screen of the input interface, an input signal, the input signal being one of a traced pattern in the point array and a gesture drawing;
    analyzing the received input signal relative to the database to identify another operating page of the plurality of operating pages; and
    navigating through the user interface of the machine or plant from the given operating page to the other operating page of the plurality of operating pages based on the analyzing.

2. The method according to claim 1, wherein the input interface is released by pressing and keeping pressed a mechanical release button.

3. The method according to claim 1, wherein the input interface is released by pressing and keeping pressed a virtual release button on the touch screen.

4. The method according to claim 1, wherein the input interface includes a gesture control for detecting the gesture drawing.

5. The method according to claim 4, wherein the gesture drawing is a drawn figure comprising a triangle, a circle, a different geometrical shape or a quasi-three-dimensional that is based on intensity recognition.

6. The method according to claim 1, wherein the input interface comprises a numerical keypad.

7. The method according to claim 1, wherein the input interface comprises a pattern input field and the input signal is the traced pattern.

8. The method according to claim 1, wherein the input interface comprises a function for storing and a linkage between the input signal and a corresponding operating page of the plurality of operating pages.

9. The method according to claim 8, wherein a save function searches the database, before saving, for a doubling of the entry and of the linkage of the operating page.

10. The method according to claim 1, wherein the input interface has a search function and a linkage between the input signal and an operating page of the plurality of operating pages is search therewith in the database.

11. The method according to claim 1, wherein the input interface has a manage function and a linkage between the input signal and an operating page of the plurality of operating pages is managed therewith in the database, wherein in particular a plurality of linkages is sorted or a linkage is deleted.

12. The method according to claim 1, wherein the database is a relational database.

13. The method for manufacturing a product from thermoplastic, wherein an extruder is operated for plastification of a thermoplastic, wherein during production, the method according to claim 1 is performed.

14. A plant control for quick navigation in a user interface for monitoring and controlling a machine or a plant for manufacturing a product from thermoplastic, the plant or machine having an extruder for plastification of a thermoplastic, the user interface having a plurality of operating pages, wherein a user enters an input signal comprising one of a traced pattern in a point array and a gesture drawing, via an input interface, for navigating through the user interface of the machine or plant, the input interface having a touch screen, wherein the plant control has a data processing and detection unit, the data processing and detection unit having a program and an access to a database, the program being adapted for performing a method according to claim 1.

15. The machine control according to claim 14, wherein the machine control comprises a release button which releases the input interface.

16. The machine control according to claim 14, wherein the input signal is linked to an operating page in the database and the user interface changes directly to the linked operating page when the input signal is entered.

17. The plant for manufacturing a product from thermoplastic, with an extruder for plastification of a thermoplastic, wherein the plant has a machine control according to claim 13.

18. The method according to claim 1, further comprising:
assigning a respective operating page of the plurality of operating pages to a respective unique input signal that is one of a unique traced pattern in a point array and a unique gesture drawing to associate the respective operating page with the respective unique input signal;
evaluating the association of the respective operating page with the respective unique input signal relative to the database to determine whether a similar association exists in the database; and
storing the association of the respective operating page with the respective unique input signal in the database in response to determining that no similar association exists in the database.

* * * * *